R. M. HOPKINS.
RECORDING SYSTEM AND APPARATUS.
APPLICATION FILED JAN. 27, 1917.
1,308,772.
Patented July 8, 1919.
9 SHEETS—SHEET 1.
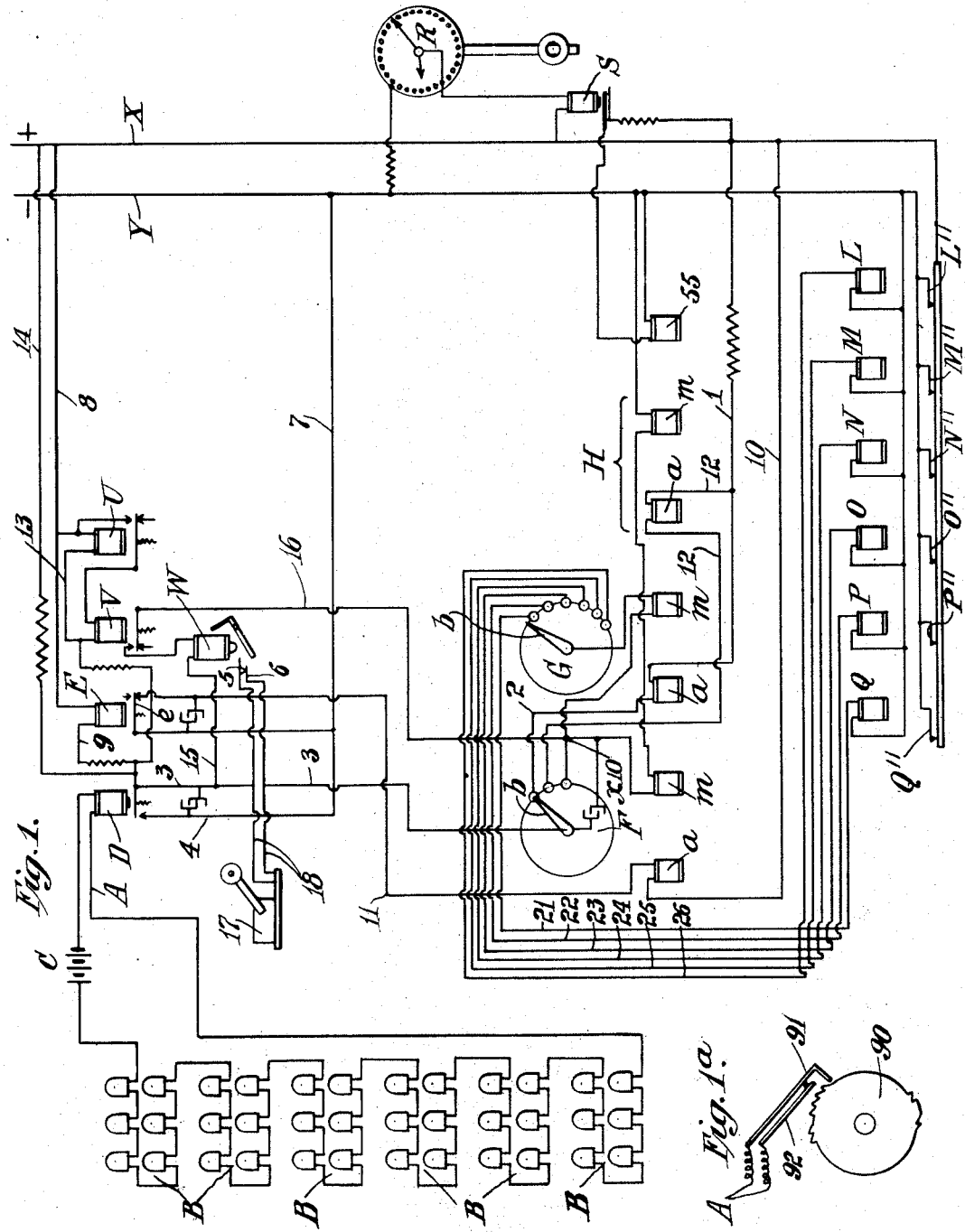

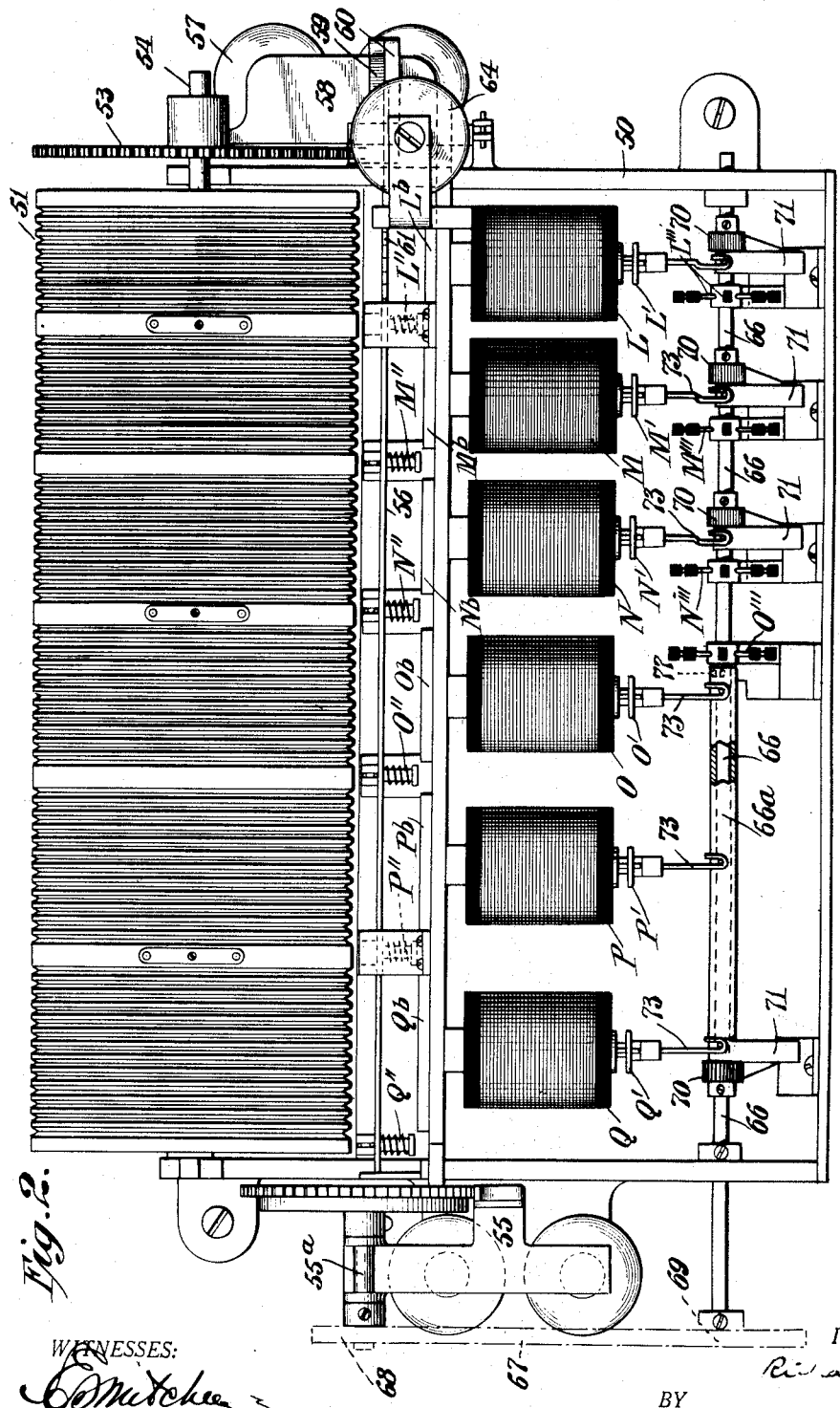

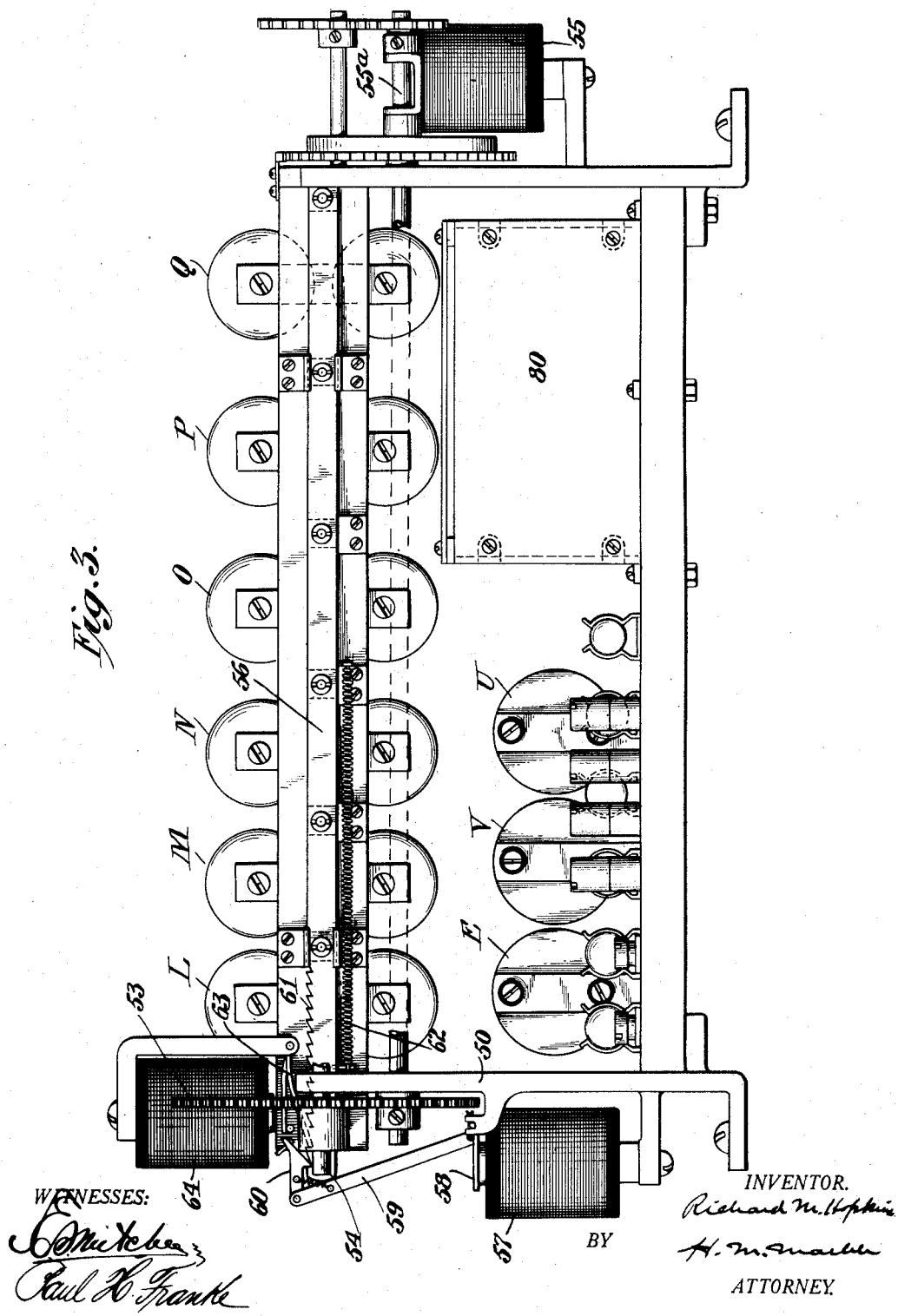

R. M. HOPKINS.
RECORDING SYSTEM AND APPARATUS.
APPLICATION FILED JAN. 27, 1917.
1,308,772.
Patented July 8, 1919.
9 SHEETS—SHEET 4.
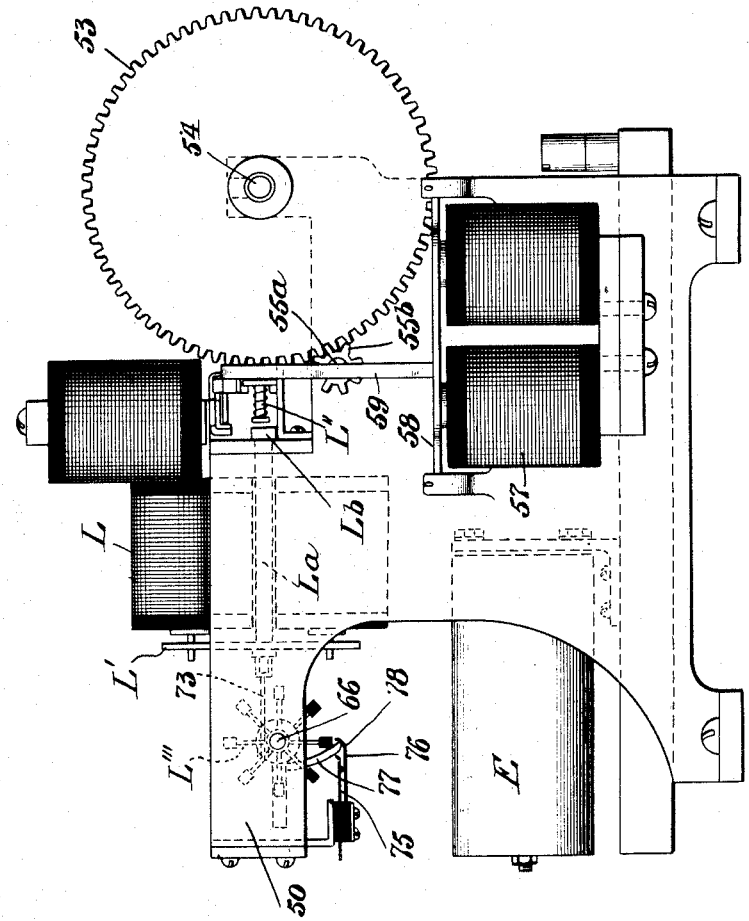
WITNESSES:
INVENTOR.
Richard M. Hopkins
BY
ATTORNEY.

R. M. HOPKINS.
RECORDING SYSTEM AND APPARATUS.
APPLICATION FILED JAN. 27, 1917.
1,308,772.
Patented July 8, 1919.
9 SHEETS—SHEET 5.
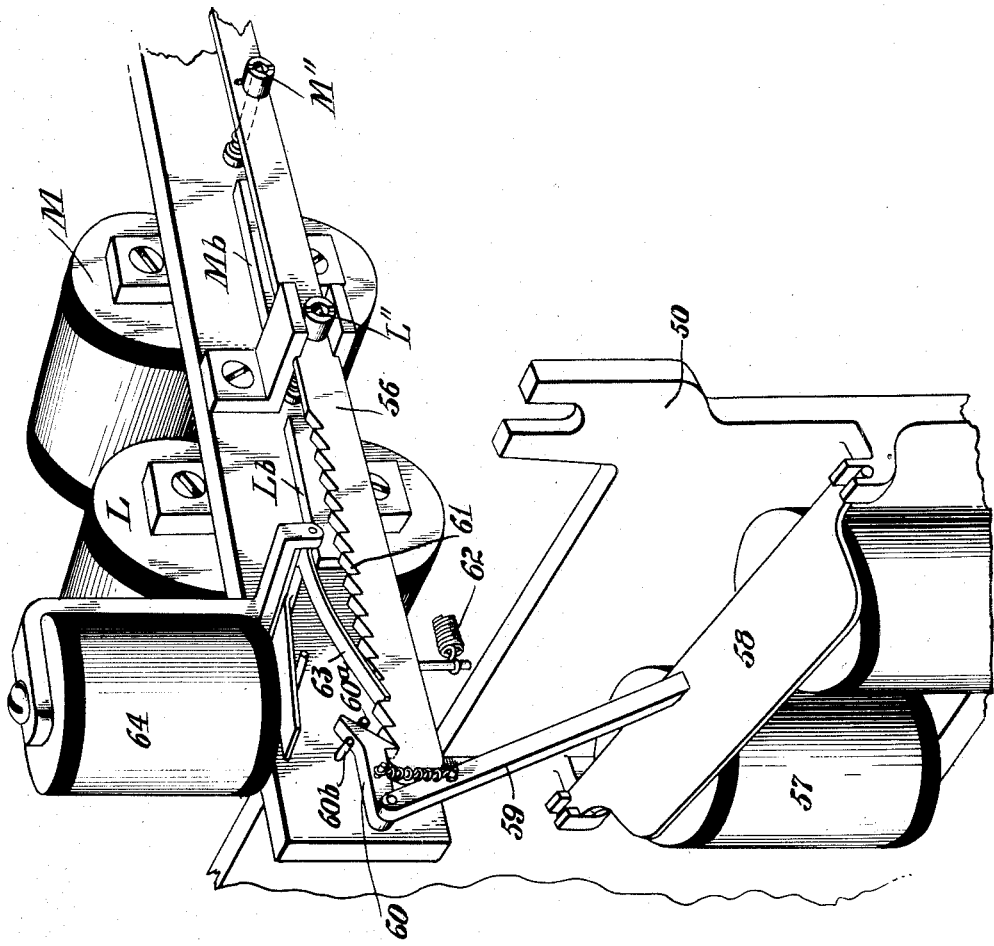
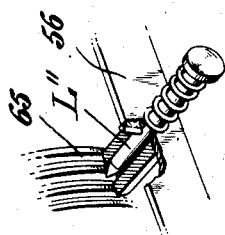
WITNESSES:
INVENTOR.
Richard M. Hopkins
BY
ATTORNEY.

R. M. HOPKINS.
RECORDING SYSTEM AND APPARATUS.
APPLICATION FILED JAN. 27, 1917.
1,308,772.
Patented July 8, 1919.
9 SHEETS—SHEET 6.
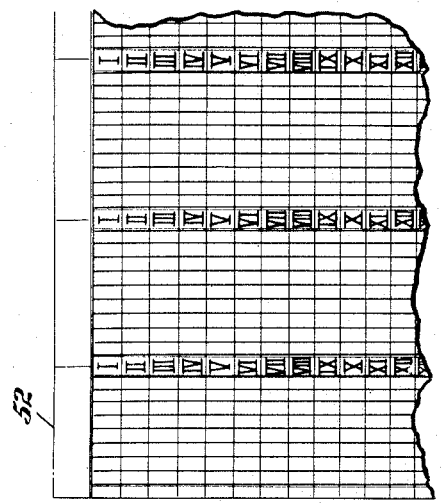
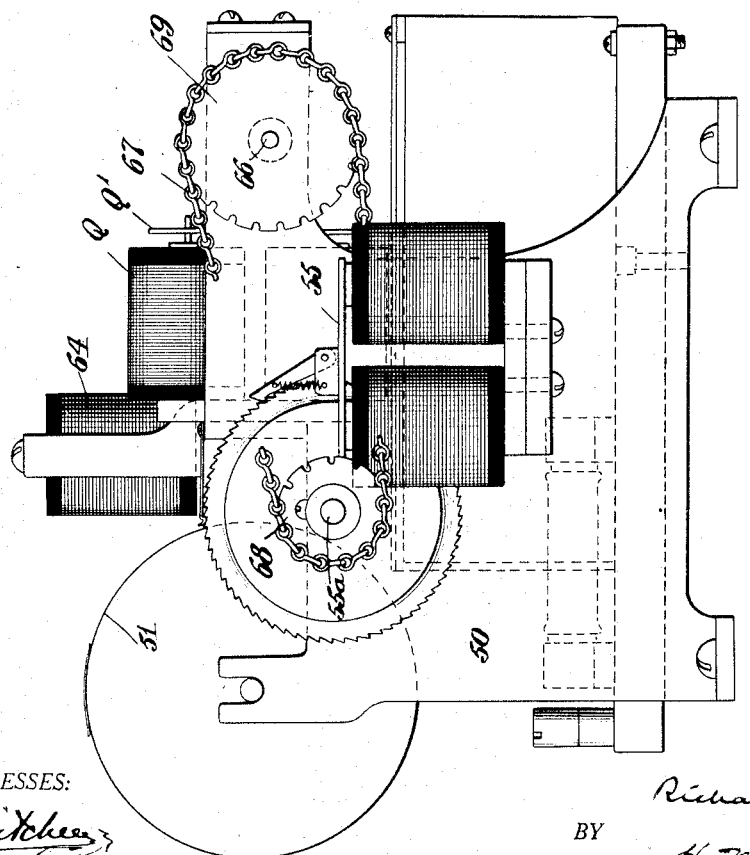
WITNESSES:
INVENTOR.
Richard M. Hopkins
BY
ATTORNEY.

R. M. HOPKINS.
RECORDING SYSTEM AND APPARATUS.
APPLICATION FILED JAN. 27, 1917.
1,308,772.
Patented July 8, 1919.
9 SHEETS—SHEET 7.
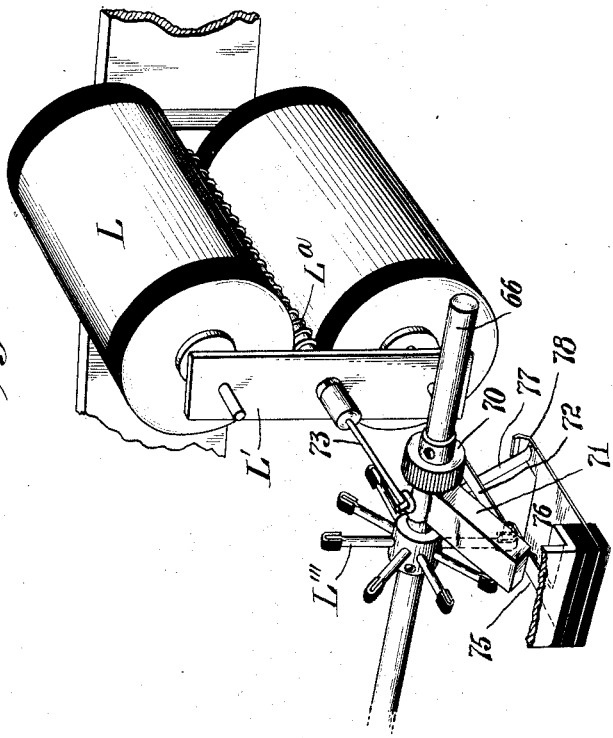
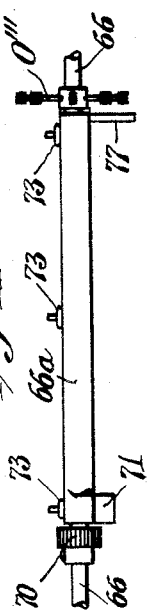
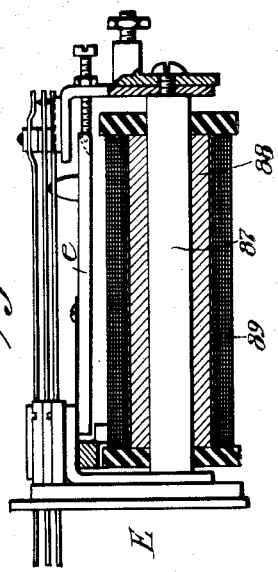
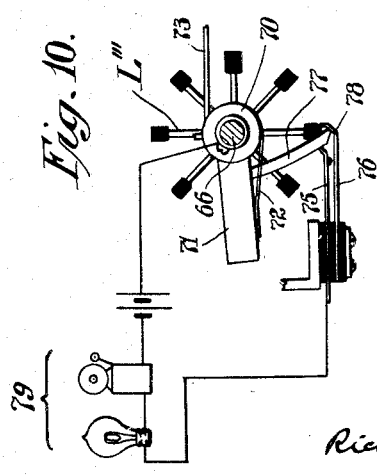
INVENTOR.
Richard M. Hopkins
WITNESSES:
BY
ATTORNEY.

R. M. HOPKINS.
RECORDING SYSTEM AND APPARATUS.
APPLICATION FILED JAN. 27, 1917.
1,308,772.
Patented July 8, 1919.
9 SHEETS—SHEET 8.
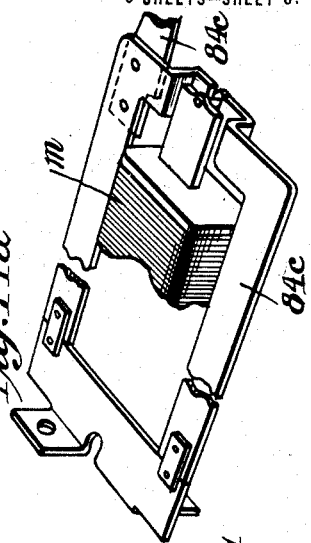
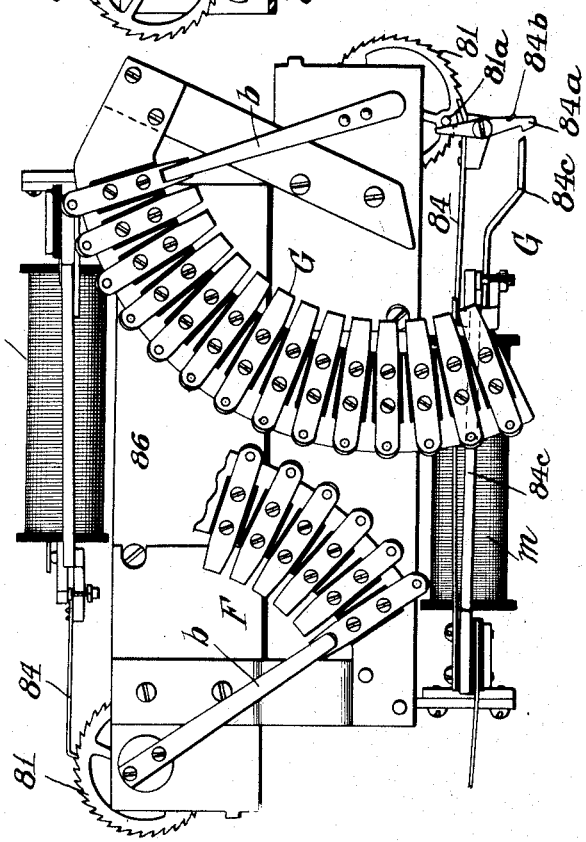
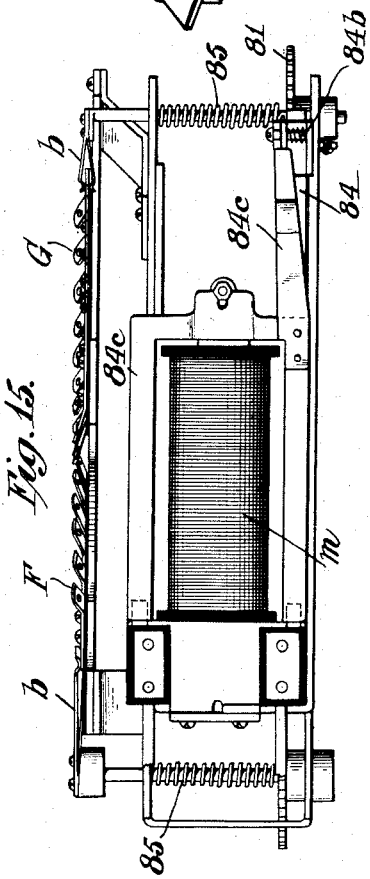
WITNESSES:
INVENTOR.
Richard M. Hopkins
BY
ATTORNEY.

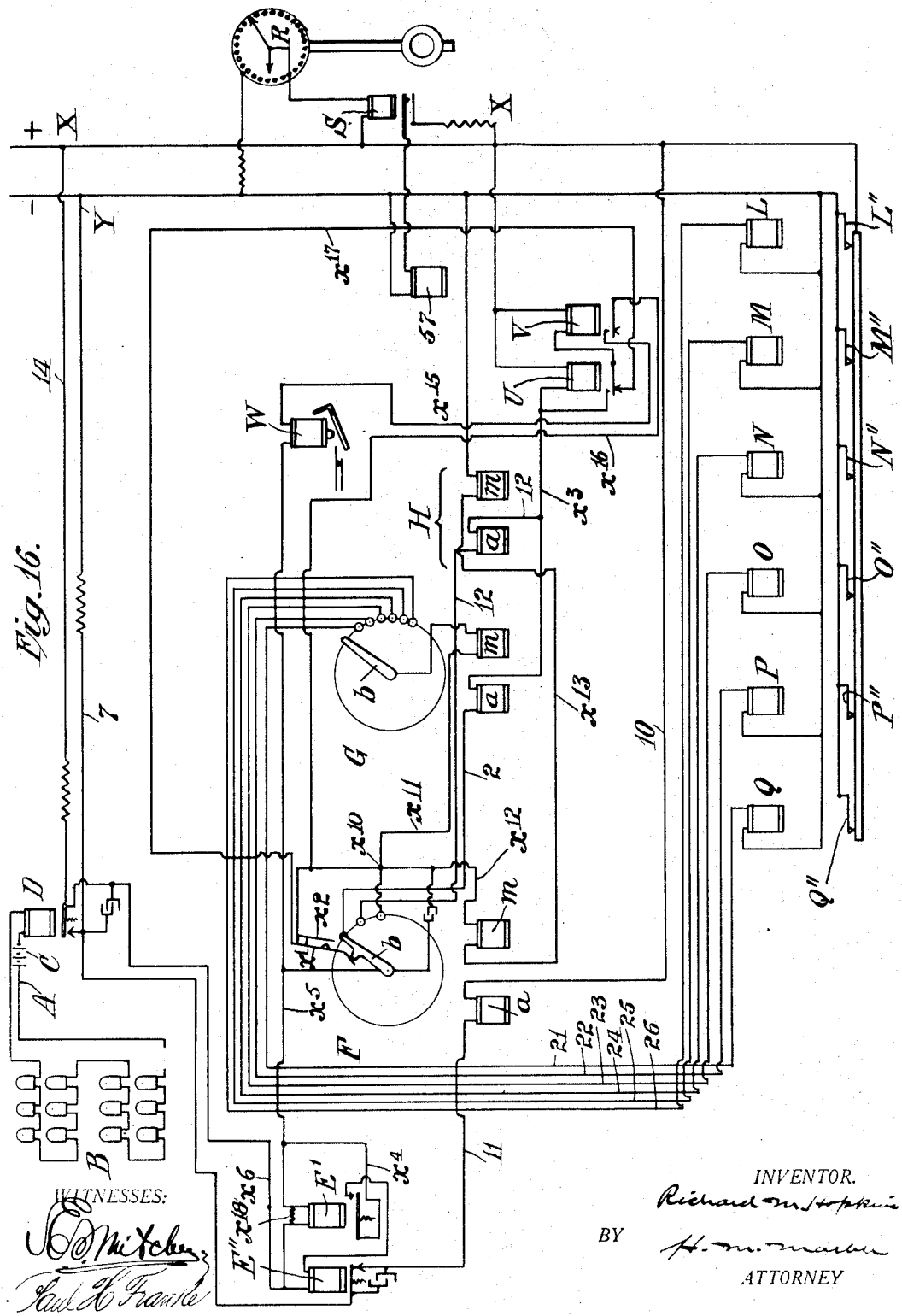

UNITED STATES PATENT OFFICE.

RICHARD M. HOPKINS, OF NEW YORK, N. Y., ASSIGNOR TO AMERICAN DISTRICT TELEGRAPH COMPANY, OF JERSEY CITY, NEW JERSEY, A CORPORATION OF NEW JERSEY.

RECORDING SYSTEM AND APPARATUS.

1,308,772.            Specification of Letters Patent.        Patented July 8, 1919.

Application filed January 27, 1917. Serial No. 144,952.

*To all whom it may concern:*

Be it known that I, RICHARD M. HOPKINS, a citizen of the United States of America, and a resident of New York, county of New York, and State of New York, have invented a certain new and useful Recording System and Apparatus, of which the following is a specification.

My invention relates to systems and apparatus for recording the signals of watchmen's signal boxes and the like. Heretofore it has been common to record the signals of a plurality of watchmen's signal boxes on a single circuit, without distinguishing, other than by the box number, between locations from which the signals come. In many cases it happens that the signal boxes of several subscribers or premises or buildings are located in the same circuit, and it is desirable to make the records for the different subscribers, or premises, or buildings, on different portions of a record sheet, or on different record sheets or dials. For example, it is desirable to be able to send, periodically, to each subscriber, the records of signals received from the boxes in his own premises, without, of course, sending to him the records from the boxes in the same circuit which are in the premises of other subscribers. In any case, it is obviously desirable to record the signals from the boxes of any one subscriber or premises, separately from the signals from the boxes of other subscribers or premises. The present invention comprises means whereby this may be done; *i. e.*, a record of the signals from any one group of signal boxes of a circuit may be made which shall be entirely separate from the records of other groups of boxes of the same circuit. My invention consists in means whereby such separate groups of records may be made automatically; in means whereby derangement may not be caused because some signal boxes operate rapidly and others slowly; and in other features more fully described hereinafter and particularly pointed out in the appended claims.

Hereinafter, for convenience in description, it will be considered that each group of signal boxes pertains to a separate subscriber, and, correspondingly, that each signal-recording magnet and its corresponding punching or other marking mechanism, hereinafter referred to, pertain to a single subscriber. Obviously, in point of fact, one subscriber might have a plurality of groups of signal boxes; all of the signal boxes of all of the groups herein contemplated might be located on premises of the same subscriber; and the term "subscriber" is, in itself, a mere convenient reference term, without any necessary relation to the facts of any particular installation or installations. However, for convenient classification and recording of signals, it is desirable that the boxes of a circuit be divided into groups, and for the purpose of description it is convenient to consider that each group of boxes pertains to the premises of a single subscriber; and in actual practice this will usually be the case.

The objects of my invention are to distinguish, in the recording of signals transmitted through a circuit, between the signals of the boxes of different subscribers, and to group the records of signals from the boxes of each subscriber separately from the records of signals from the boxes of other subscribers, while employing a single line circuit only from the boxes of all of the said subscribers; to avoid derangement or disturbance or false signaling or false recording of signals due to different boxes having different speeds of operation; to avoid derangement due to clashing of signals, and, in general, to provide simple and reliable apparatus and circuits for the accomplishment of the above objects.

I will now proceed to describe with reference to the accompanying drawings, apparatus and circuits constituting one embodiment of my invention, and will then point out the novel features in claims. In said drawings:

Figure 1 is a diagram illustrating a signal box circuit with a plurality of groups of signal boxes therein, and also illustrating diagrammatically the several selectors, relays, and record-making devices of the system.

Fig. 1ª shows an elevation of a characteristic break wheel and its coacting brush or pen, such as may be used in signal boxes such as are illustrated diagrammatically in Fig. 1.

Fig. 2 shows a top view of the recorder illustrated diagrammatically in Fig. 1.

Fig. 3 shows a rear vertical elevation of the said recorder, with the record carrying drum 51 removed.

Fig. 4 shows a side elevation of the recorder looking from the right of Fig. 2.

Fig. 5 shows a fragmentary perspective elevation of the punch carriage, its supports, two of the punch-operating magnets, and the punch-carriage feed and return mechanisms.

Fig. 6 shows a fragmentary perspective elevation and partial section of one of the punches, certain associated parts being also shown.

Fig. 7 shows a side elevation of the recorder looking from the left of Fig. 2.

Fig. 8 shows a fragmentary face view of a portion of one of the record sheets.

Fig. 9 shows a fragmentary perspective elevation of one of the delinquency-signal contact devices.

Fig. 10 shows a fragmentary side elevation of one of those delinquency-signal contact devices.

Fig. 11 is a detail side view of a portion of the delinquency signal device whereby delinquency signals may be given for a plurality of groups of signal boxes as if those groups together formed one group only.

Fig. 12 is a central longitudinal section of a slow-acting relay such as may be used in my system, as hereinafter described.

Fig. 13 is a side elevation of the master selector and the primary selector, combined to form one mechanism.

Fig. 14 is a central longitudinal section of the mechanism shown in Fig. 13, with the central portion of the mechanism broken away.

Fig. 14ª is a detail perspective fragmentary elevation of the release magnet, pole-piece and armature of the primary selector.

Fig. 15 is a top view of the selector mechanism shown in Fig. 13.

Fig. 16 is a diagrammatic figure similar to Fig. 1, but showing an alternative arrangement of circuits and apparatus.

Referring first to Fig. 1: A designates a signal box circuit comprising six groups of signal boxes B, the number of boxes in each group being variable. Each such box may be understood to comprise a signal-transmitting mechanism of the familiar toothed wheel and pen type, as shown, for example, in Fig. 1ª: which mechanism, when operated, will break and complete the circuit A according to some prearranged signal, distinctive of the particular box to which the transmitting mechanism operated belongs. Such signal may be considered to be a box number, each number to consist of two digits; one digit, preferably the initial digit, of the signals of the boxes of any one subscriber, i. e., the initial digit of all of the boxes of any one group, will be the same. In other words, the signals of all of the boxes of one group will begin with the digit "2"; the signals of all of the boxes of another group will begin with the digit "3"; and so on. It should be explained, further, that the term "digit" is employed herein in a special sense. In the ordinary sense the term "digit" includes any of the numerals from one to nine inclusive. The break wheels of the signal boxes comprise teeth, with intervening notches, arranged in two groups separated by spaces; and the number of teeth in any one of these groups may exceed 9; yet it is convenient to speak of the numeral represented by the teeth of any one such group as a digit, and no departure from principle is involved in so doing.

C designates a battery or other source of current supply, in circuit A, and D designates a main line relay, in said circuit A, which repeats the signals of boxes B in the local or central station circuits, as hereinafter described. The elements of the digits of the box signal are repeated by said relay D into the actuating magnet $a$ of a primary selector G as follows:

From supply conductor X through conductor 1, the ratchet magnet $a$ of selector G (hereinafter described) conductor 2, the first contact point and contact arm $b$ of a master selector F and conductor 3, contacts 5 and 6 (normally closed, and the function of which will be explained hereafter), to the armature and rear contact stop of main line relay D and thence through conductor 4, and common return conductor 7, to the other supply conductor Y. Selectors F and G are step-by-step selectors of a generally well known type, and it will be obvious that the impulses of the first digit of any one of signal boxes B which may be operated, as such impulses are transmitted through magnet $a$ of selector G, will cause the contact arm $b$ of that selector to travel successively over the contact points of the selector until, at the end of the first digit of the box number, that contact arm $b$ will have come to rest on a particular contact point of the selector, thereby forming a circuit through one of the wires 21—26 leading from the contact points of said selector G to one of the punch-operating magnets L—Q (the function of which punch-magnets will be explained hereinafter).

E designates a slow acting relay, the magnet of which is connected by conductor 8 to supply conductor X, and is connected by conductor 9 to the armature of line relay D. It will be obvious that each time the armature of relay D is retracted, circuit is completed through the magnet of relay E, and through conductor 7. However, this relay E is so slow in action that while its armature $c$ is moved away from the corresponding rear contact stop during the first closure of the contact of relay D in the transmission of a digit, it does not again contact with its rear stop during the spaces between closures by relay D during the transmission of that digit. The longer spaces between the digits of the box signals do, however, cause the armature of relay E to close contact with its rear contact stop, thereby closing a circuit from conductor X through conductor 10, the ratchet magnet $a$ of master selector F and conductor 11, the rear contact stop of relay E, armature $e$ and thence through conductor 7 to supply conductor Y. Closing this circuit 10—11 causes the contact arm $b$ of selector F to move to the second contact point of selector F, thereby cutting out of circuit the ratchet magnet $a$ of selector G and cutting into circuit 1—12—3—4—7, the ratchet magnet $a$ of a third selector, H. As explained hereinafter, this third selector, H, does not have contact points as do the previous selectors F and G, but instead comprises ratchet mechanism whereby, by the impulses of the second digit of the box signal repeated by relay D through magnet $a$ of this third selector H, the punches of the recording mechanism are spaced along to a position determined by the numerical value of the second digit of the box number.

The armature of relay E is attracted during the transmission of the impulses of the second digit of the box number; but during the space following the second digit, the armature of relay E is again released, thereby operating magnet $a$ of master selector F and moving the contact arm $b$ of that selector to the third contact point of the selector. The instant ratchet magnet $a$ of master selector F has been so energized, and has moved arm $b$ of master selector F into contact with the third contact point of that selector, a circuit is completed from supply conductor X through conductor 8, magnet E, conductors 9 and 3, contact arm $b$ of selector F, the third contact of that selector, the release magnet $m$ of selector G, the contact arm $b$ of that selector, the contact point of that selector on which such arm $b$ is then resting, the selected punch magnet of series L—Q (thereby causing action of the corresponding punching mechanism, as hereinafter described) and the return conductor to which those magnets are connected, to supply conductor Y; the armature $e$ of relay E being thereby attracted, the circuit of magnet $a$ of the master selector F is broken; and as the release magnets $m$ of selectors F and H have been energized by closure of their circuit through the third contact point of selector F, (the circuit by which magnet $m$ of selector G is energized has just been traced, and magnet $m$ of selector F is in a branch of that circuit, departing therefrom at point $x^{10}$ and thence leading through magnets $m$ of selectors F and H to return conductor Y), the arms $b$ of selectors F and G, and the punch-carrying carriage (hereinafter mentioned) of selector H will all return. As hereinafter described, the release of arm $b$ of selector G occurs upon the breaking of the circuit of its magnet $m$ by the return to normal of arm $b$ of selector F, following energization of magnets $m$ of selectors F and G. The arms $b$ of selectors F and G when permitted to return, move to a point somewhat beyond or in rear of the first contact points of those selectors. The magnet $a$ of selector F being in a circuit which is normally closed, and that magnet $a$ being energized immediately upon the return of the arm $b$ to normal, immediately moves such arm $b$ to the first contact point of selector F and holds it there until, the circuit magnet $a$ being broken and subsequently completed, the ratchet pawl, hereinafter referred to, operated by such magnet $a$, retreats, engages another tooth of the ratchet operating-mechanism of that arm $b$, and moves such arm $b$ to the second point of the selector.

Magnet $a$ of selector G is in a normally open circuit, and therefore that arm $b$, when returned, remains in rear of the first contact point of selector G, until through the receipt of the first digit of the signal of a box, that arm $b$ is advanced to the first, and possibly to some other contact point of the selector.

Referring now to Figs. 2-15 inclusive, illustrating the multi-record recorder itself, together with the several selectors which, though functionally instruments separate from the recorder, in the construction shown are structurally combined with the recorder proper:

50 designates a suitable frame upon which is mounted revolubly a drum 51 adapted to carry a suitable record sheet shown in part in Fig. 8, and there designated by numeral 52. This sheet is suitably divided, by ruled lines, horizontally, for time intervals, and vertically, for spaces corresponding to box numbers. 53 designates a gear wheel, mounted upon the shaft 54 of the drum 51, and 55 (Fig. 7) designates a magnet-operated ratchet mechanism by which gear wheel 53, and so drum 51, is rotated through counter shaft $55^a$ and pinion $55^b$. The magnet of this ratchet mechanism is energized at suitable intervals by a time movement R (Fig. 1), and relay S; and therefore the horizontal rulings on record sheet 52 correspond to time intervals.

L, M, N, O, P and Q designate punch-operating magnets, each corresponding to one of the groups of signal-boxes B of Fig. 1, and each, therefore, corresponding to a particular subscriber, as explained above. L', M', etc., designate the armatures of these magnets, and L'', M'', etc., the corresponding punches, operated by these magnets and armatures. The punches are all mounted upon a sliding bar 56, adapted to be moved step-by-step from left to right (as viewed from the front of the machine) by ratchet mechanism comprising a magnet 57 (Fig. 5—which is the same as magnet $a$ of selector H of Fig. 1), the mechanism by which these punches are shifted constituting the "selector H" of Fig. 1, a swinging armature 58 therefor, having a projecting arm 59, and a spring-actuated pawl 60 adapted to engage teeth 61 formed on said bar 56. A pin $60^a$ raises pawl 60 clear of the teeth 61, each time the armature of magnet 57 is retracted; and a pin $60^b$ holds pawl 60 in engagement with a tooth 61, each time the armature of magnet 57 is attracted, and also prevents overthrow. A spring 62 tends to pull said bar to the right (as seen in Fig. 5) and will restore the bar from any position to which it may have been adjusted by the ratchet mechanism, when permitted to do so. 63 designates a holding pawl for the bar 56, and 64 a magnet (which is the same as magnet $m$ of selector H of Fig. 1) which, when energized, will lift said pawl 63 thereby permitting spring 62 to restore punch-carrying bar 56. The armatures L', M', etc., have spring-actuated rods $L^a$, $M^a$, etc., carrying hammers $L^b$, $M^b$, etc., which are broad, and each will engage and operate its corresponding punch in any position to which that punch may have been adjusted by the action of the ratchet magnet 57 and pawl 60 on bar 56. The drum 51 has grooves 65 opposite the various punching-positions, so that the punch points, after passing through the record sheet, do not touch the surface of the drum and so are not blunted.

It will be noted that each punch has its own return spring, which is independent of the return spring of the corresponding armature and hammer of the corresponding punch-magnet; and that each punch is entirely disconnected from the corresponding armature and hammer. This is a decided advantage for various reasons; it not only facilitates relative motion between the punch and its corresponding hammer, but facilitates quick return both of the hammer and of the corresponding punch; and it is also particularly convenient in assembling and disassembling.

Since some subscribers will have a greater number of boxes than will other subscribers, space on the drum may be saved by allotting a less number of grooves 65 on the drum to one magnet of series L, M, etc., than to others; and I have shown the drum as provided with groove-groups of progressively increasing number from right to left.

*Indication of delinquencies.*—Each watchman is supposed to operate his signal boxes at specified times, but a slight leeway is provided. If no signal comes from any particular group of signal boxes at the time allotted for the beginning of signals for that group, plus the leeway interval allowed, or from some other box of the group during the leeway or grace interval allowed after the sending of a signal from another box of the group, a delinquency is said to have occurred, and it is desired to give a signal for each such delinquency. To this end, a shaft 66 is provided, which shaft is driven at a suitable speed ratio from shaft $55^a$ by a suitable sprocket-chain 67 and suitable sprocket gears 68 and 69 on shaft $55^a$ and 66; and this shaft carries suitable contact-operating arms L''', M''', etc., one group of arms for each subscriber.

On shaft 66 and near each group of contact-operating arms L''', M''', etc., is a ratchet wheel 70 which rotates with shaft 66. Adjacent each such ratchet wheel 70 is an arm 71 having a spring pawl 72 normally engaging ratchet wheel 70 and holding arm 71 up, except that as shaft 66 rotates anti-clockwise (as viewed from the right of Fig. 9) this arm 71 may fall. There is a connection 73 from each arm 71 to the armature L', M', etc., of the corresponding punch magnet L, M, and each time such magnet is energized by a watchman's signal, the arm 71 is pulled back. In other words whenever the watchman operates one of his signal boxes, as each box so operated starts to send in its signal, the corresponding arm 71 will be pulled back, each time the corresponding magnet L, M, etc., is energized. After each impulse of the box signal, and corresponding energization of the magnet L, M, etc., the arm 71 will drop as shaft 66 rotates, but will be returned upon the next energization of such magnet. Each arm 71 is provided with a projecting arm 77 which, normally, rests against a hook 78 of a contact spring 76, itself adapted to close contact with a corresponding spring 75. The hook 78 limits the downward motion of the arm 71, and at the same time separates spring 76 from spring 75. Each time an arm 71 is raised by energization of the corresponding magnet L, M, etc., the corresponding springs 75 and 76 come together.

Suppose now that it is time for a watchman to begin his round. If he begins within the grace period the operation of the first signal box of his round will energize the corresponding magnet (for example magnet L) and will raise the corresponding arm 71, and with it the corresponding contact arm 77 (such arm 77 therefore breaking contact with 78) so permitting the corresponding springs 75 and 76 to come together; but the delinquency signal circuit will not be completed, since that circuit must be completed through arm 77 as well as through springs 75 and 76. But suppose that the watchman does not operate the first signal box, or any other signal box of the group, within the grace period. In such event, arm 77 will remain in contact with spring 76; and at the end of the grace period, following the time when the watchman should have begun his round, one of the arms L''', will contact with spring 75 forcing that spring into contact with spring 76, and so closing circuit through delinquency signal devices 79; for arm 77 is then in contact with the hook 78 of spring 76. A delinquency signal will then be given.

If, after any of the boxes of one group has been operated, another box of that group is not operated within the grace period, a delinquency signal will be given without the action of any of the arms L'''; for in such case springs 75 and 76 will already be in contact, and the delinquency circuit is closed as soon as, at the end of a grace period, arm 77 touches spring 76.

It will be seen that the grace period begins anew after each box is operated.

Usually such number of arms L''', M''', etc., are provided that contact will be closed between springs 75 and 76, each hour, at the expiration of the watchman's grace period, holding such contact closed for about two minutes. But of course the intervals between closures of contacts 75 and 76 by arms L''', M''', etc., may be made shorter or longer, and also the period during which contacts 75 and 76 are held together by arms L''', M''', etc., may be varied, as desired. It is not desired to give a delinquency signal if one or two boxes be omitted altogether, by the watchman; the record sheet will show that. What is desired is, to give a delinquency signal if the watchman fails to start his round at the proper time, or within the grace period thereafter, or stops between boxes for longer than the grace period.

The delinquency signal device above described will give a signal at the expiration of the grace period following the completion of an entire round of a group of boxes; such signal is not a true delinquency signal, but is rather an announcement to the central office attendant of the completion of the entire round; it being the intention that upon the receipt of such signal the central station attendant shall then inspect the record on the sheet to see that all the signal boxes have been operated, and to see in what order they have been operated.

In some cases it is desired to interconnect the delinquency signal devices for two or more groups of signal boxes, as if such groups together constituted one group only, so that a delinquency signal will be given only if a delinquency occurs before or during the sending of signals from such combined group. Such an occasion arises, for example, when the same watchman has in charge two or more groups of signal boxes. In Figs. 2 and 11 I have shown means for so interconnecting the delinquency signal devices corresponding to magnets O, P and Q.

The shaft 66 is surrounded by a sleeve 66$^a$ to which the rods 73 corresponding to magnets O, P and Q are connected; and to this sleeve 66$^a$ is secured an arm 71 (there being but one arm 71 for all three magnets O, P and Q). Adjacent to sleeve 66$^a$ is a ratchet wheel 70, secured to shaft 66, there being but one ratchet wheel 70 for the three magnets O, P and Q. Also adjacent to sleeve 66$^a$ there is a set of arms O''', there being but one set of such arms for all three magnets O, P and Q. In this case, the arm 77 is secured to sleeve 66$^a$.

As will be evident, energization of any one of the magnets O, P and Q, draws back the arms 71 and 77 of sleeve 66$^a$. As will also be apparent, the operation of the device comprising the sleeve 66$^a$ is precisely the same as that of the delinquency signal device of magnet L, already described; except that since the armatures of all the magnets O, P and Q are connected to the sleeve 66$^a$, the energization of any one of those magnets during the time when the signal boxes of the three combined groups should be operated, will raise arms 71 and 77 connected to said sleeve 66$^a$, so preventing the sending of a delinquency signal.

*Selectors.*—The selectors F and G of the recorder are similar in construction, and are grouped in a case 80 (Fig. 3). Each of these selectors comprises a row of contact points, a contact-arm $b$ adapted to travel over these points successively and to make contact therewith, a ratchet wheel 81 connected to such arm $b$ to move the same, a ratchet magnet $a$, an armature 82 therefor, a spring-returned ratchet-pawl 83 operated by said armature 82, and engaging the teeth of ratchet wheel 81 to rotate said wheel, a holding pawl 84, and a release magnet $m$ which, in the case of selector F, when energized, pulls pawl 84 clear of the ratchet wheel 81, so permitting return movement of that ratchet wheel and contact arm $b$ under the influence of a spring 85. The manner of release of arm $b$ of selector G will be explained hereinafter. When ratchet magnet $a$ of selector G is energized, the first portion of the resulting movement of the ratchet pawl 83 of that selector moves that pawl into engagement with a tooth of the corresponding ratchet wheel 81; further movement of that pawl advancing the ratchet-wheel through the space of one tooth, whereupon the ratchet wheel is held, temporarily against return, by holding pawl 84. Successive energizations of the ratchet magnet $a$ of either selector advance the ratchet wheel 81 a number of spaces corresponding to the numerical value of the digit of the box signal by which that ratchet magnet is being operated.

The pawl 84 of selector G (the right hand selector shown in Figs. 13 and 14) carries a pawl $84^a$ which, when the ratchet wheel 81 is in normal position, is held in the position shown by a pin $81^a$ carried by ratchet wheel 81. When wheel 81 of selector G is advanced by ratchet pawl 82, a spring $84^b$ forces pawl $84^a$ into position for engagement with an extension of armature $84^c$. When magnet $m$ of selector G is energized, the armature $84^c$ is pulled up so that the extension of said armature engages with the hook of pawl $84^a$. Upon deënergization of such magnet $m$ and consequent retraction of armature $84^c$, the extension of such armature, being still in engagement with pawl $84^a$, will raise that pawl, and with it, the holding pawl 84, so permitting return of ratchet wheel 81; and at the end of such return pin $81^a$ disengages $84^a$ from $84^c$.

As will be noted, the pivots of the contact-arms $b$ are at diagonally-opposite corners of the frame 86, the contact-point arcs of the two selectors being located between these pivots, and the magnets of the selectors being located one above another; an arrangement which promotes extreme compactness of the selector mechanism, as well as accessibility.

*Time relay E.*—As will be apparent from the foregoing description, the slow-acting or "time"-relay E, also sometimes termed the "governor" relay, performs an important part in the operation of the system, since it distinguishes between the spaces between impulses of the digits of the signal and the spaces between digits, so causing the master selector F to operate only upon the occurrence of a space between digits, or a space following the last digit of the box signals. Various types of slow-acting relays are known; for example, relays having weighted armatures, and which, because of the inertia effect of such weighted armatures, will operate slowly; also relays having dashpots, or fan trains, or like retarding means, connected to their armatures; also relays having their magnet circuits controlled by contacts operated by a thermostatic member itself operated by a heating coil. I prefer to use, for the relay E, however, a relay having a "short-circuited core"—that is to say, a relay the magnet core of which is surrounded by a sheath of high-conductivity metal. Such a relay is illustrated in Fig. 12, wherein 87 designates the core, 88 the surrounding sheath of high-conductivity metal, and 89 the energizing windings of the relay. The contact-making and breaking devices of the particular relay illustrated in Fig. 12 are those of a relay of the so-called "telephone" type, and require no description; any other armature-operated contact-making and breaking devices may be used instead. The eddy currents induced in the sheath 88 of such a relay by rise and fall of magnetization of the core, greatly retard the action of the relay, without interfering with the formation of firm contacts, and without adding moving parts to the relay. When an energizing circuit is closed through the coils of the relay and the armature thereby attracted, the armature leaves its rear stop as promptly, or nearly as promptly, as in the case of an ordinary relay, but does not reach its front contact stop until after the elapse of what is, relatively, a considerable interval of time; for example, one-quarter of a second. Similarly, the movement of the armature from its front stop to its rear stop is greatly retarded, as compared with the action of an ordinary relay.

While short circuited-core relays are not new, such a relay, employed as the relay E of the system above described, has a very special and important and novel action in connection with the signal boxes and circuits of my system; for these signal boxes, even boxes on the same circuit, operate at widely different speeds, so much so that the spaces between impulses of a digit of one box may be longer than the spaces between digits of another box. The short circuited core relay E automatically compensates for this condition: for if the box which is sending in a signal be one which is rapid in operation, the magnetization of the core of relay E does not rise to a high value during the impulses of the signal, and consequently the armature of the relay drops away from the front stop quickly after each such impulse has terminated; while if the box which is sending in a signal be one which is slow in operation, the magnetization of the core of relay E rises to a much higher value during the impulses of the signal, and consequently the armature of the relay drops away from the front contact stop slowly after each such impulse has terminated. In other words, the shortcircuited-core relay automatically compensates for different speeds of different boxes, in that it operates according to substantially the same ratio, between the spaces between impulses and the spaces between digits, irrespective of the speed of the box by which it is operated.

In a companion application, filed January 27, 1917, Serial No. 144,951, I have illustrated what I have termed a "mechanical governor" (as distinguished from the electrical governor which the shortcircuited-core relay E constitutes) for distinguishing automatically between spaces between impulses and spaces between digits; and the two types of governor are interchangeable. But the electrical governor is obviously to be preferred in most instances.

In some cases, particularly when the signal boxes used, or some of them, are very slow in operation, I use a plurality of short-circuited-core relays in series as the electrical governor. This I have indicated in Fig. 16, to be described presently.

*Fire signals.*—Fire signals are usually distinguished from watchman's signals by a dash, or by a Morse character containing a dash, preceding or following the box number; also, by giving the box number or signal a greater number of times than for the watchman's signal. Signal boxes which distinguish in this manner between fire signals and watchman's signals are well known and in common use. Such boxes commonly comprise means whereby the distinguishing signal (the dash or the Morse letter containing the dash) is omitted when sending watchman's signals. The break wheel 90 shown in Fig. 1ª, which wheel is characteristic of break wheels forming part of the transmitting mechanism of combined watchman and fire alarm boxes, has teeth for transmitting not only the box number (42, in the particular instance shown) but also the Morse letter F (dot, dash, dot). It is to be understood that, for watchman's signals, the boxes B are provided with one of the well-known means for eliminating this letter F from the box signal; but that when a fire signal is sent from any of these boxes the said Morse letter F is included as a part of the signal. This special fire signal is made evident at the central station as follows:

U and V, Fig. 1, are slow-acting relays, preferably similar to the relay E already described. These two relays are connected in what may be termed "cascade series"; that is to say, the contacts of relay U control the magnet circuit of relay V. The circuit for the magnet of relay U is from supply conductor X through conductor 8 to magnet of relay U, thence through conductor 13, to the armature of relay D, thence through conductors 4 and 7 to return at Y. This circuit is closed each time the pen 91 (Fig. 1ª) of the box rides upon one of the teeth of the signal wheel 90, and when in consequence, contact is broken between 91 and 92, and the armature of relay D drops. The circuit for relay V is from X and 8 through the contacts of relay U and thence, when these contacts are closed, through the magnet of relay V and to the armature of relay D and thence through conductors 4 and 7 to return at Y. The retardation obtained by employing two such relays in cascade series, and by the proper adjustment of the relays, is such that the contacts of relay V are not closed while pen 91 is passing over the short teeth of the box number of break wheel 90, but are closed during the passage of pen 91 over the dash of the Morse letter F. The contacts of relay V, so closed, complete a circuit through the magnet of a "drop relay" W, as follows: from supply conductor X, conductor 14, conductor 3, conductor 15, magnet of relay W, contacts of relay V, conductor 16, magnet $m$ of selector F, magnet $m$ of selector H, and back to return at Y. This relay W has a drop armature, which, when attracted toward the magnet of the relay, separates contacts 5 and 6, thereby opening the normally-existing shunt across the terminals of a telegraph register 17, so placing that register in the following circuit: from supply conductor X, through conductor 1, magnet $a$ of selector G, first contact point of selector F and arm $b$ of that selector, conductor 3, register loop 18, and conductor 3 again, armature of relay D, conductors 4 and 7, and back to return at Y. This results in a record being made by the register, during succeeding rounds of the box number.

The drop armature of relay W is restored by hand (or otherwise) to close contacts 5 and 6 and throw the register 17 out of action. The mere deënergization of the magnet of the relay W does not restore the armature.

The sending of the Morse letter F (dot, dash, dot) does not affect the selectors F, G and H, because there being in this letter F no space equivalent to a space between digits, governor relay E is not operated. The relay E is operated by the impulses of the letter F, breaking the circuit of magnet $a$ of selector F; and since relays U and V close the circuit of release magnet $m$ of selector F during the dash of the letter F, by a circuit from conductor X through conductor 14 and 3, magnet of relay W, contacts of relay V, conductor 16, magnet $m$ of selector F, and thence to Y, arm $b$ drops back of the first contact point of selector F; but when, during the long space following the letter F, the armature of relay E drops, the circuit of magnet $a$ of selector F is completed again, and arm $b$ of that selector is brought back to the first contact point of that selector.

*Prevention of derangement due to clashing of signals from different boxes.* (See Fig. 16.)—The circuits and instruments shown in Fig. 16 are in general the same as in Fig. 1. Selectors F, G and H are the same as in Fig. 1, except that to selector F have been added contacts $x^1$ and $x^2$, arranged to be held apart by arm $b$ of that selector when said arm is in its normal position, on the first contact point of the selector. As already stated, in Fig. 16, two governor relays, E' and E'', are employed, in "cascade series", in lieu of the single governor relay E of Fig. 1; but the single relay E of Fig. 1 might be exchanged for the relays E' and E'' of Fig. 16, and vice versa.

In Fig. 1 the magnet of relay E is in a circuit separate from that which energizes magnet $a$ of selector G. In Fig. 16 the magnet of relay E' is in series circuit with whichever ratchet magnet $a$ (of selectors G and H) that may happen to be in circuit through selector F at the moment. In both Figs. 1 and 16 the armature of relay D controls the circuit through magnet $a$ of either selector G or selector H until arm $b$ of selector F reaches its third contact point, whereupon a circuit is formed from X through conductor 14 which does not pass through the contacts of relay D.

In Fig. 1 the magnet of relay U is connected in multiple with the magnet of relay E. The magnet of relay V is in multiple with magnet of relay U, but in a circuit controlled by the contacts of relay U. The circuit of relay U is not controlled by the selectors. In Fig. 16 the magnet circuit of relay U passes through the first contact point of selector F and also through the second contact point of that selector F, but not through the third contact point of selector F. The magnet circuit of relay V is controlled by the front contacts of the relay U; also by the rear contact of relay U plus contacts $x^1$ and $x^2$ which are closed by selector F only when arm $b$ of that selector is on its second and third stops.

When arm $b$ of selector F is on the first contact point of that selector, the circuit is as follows: From supply conductor X, through magnet of relay U, conductor $x^3$, (corresponding generally to conductor 1 of Fig. 1) magnet $a$ of selector G, conductor 2, to first contact point of selector F, through arm $b$ of selector F, and conductor $x^5$ to the magnet of relay E', thence through conductor $x^6$ to the armature of relay D, and thence through the rear contact stop of relay D and conductor 7 to return at Y. There is a branch circuit $x^4$ from conductor $x^5$ through the contacts of relay E' to the magnet of relay E'' and thence to conductor $x^6$. The armature of relay E'' is connected by conductor 11 to magnet $a$ of selector F, and thence by conductor 10 to supply conductor X, as in Fig. 1.

When arm $b$ of selector F is on the second contact point of that selector, the circuit is from X through magnet of relay U, through conductor 12, magnet $a$ of selector H, and thence to the second contact point of selector F, and thence through arm $b$ of that selector, conductor $x^5$, magnet of relay E', conductor $x^6$, armature of relay D, and conductor 7 to Y.

When arm $b$ of selector F is on the third contact point of selector F, there are resetting circuits as follows: from supply conductor X, through conductor 14, conductor $x^6$, magnet of relay E', conductor $x^5$, arm $b$ of selector F, the third contact point of that selector, and point $x^{10}$, where the circuit divides, one branch passing through conductor $x^{11}$ and magnet $m$ of selector G, thence through arm $b$ of selector G and the particular contact point of that selector on which arm $b$ then rests and the corresponding conductor of series 21—26 to the corresponding punching magnet of series L—Q and thence to return at Y. This circuit, when completed, actuates the selected punching magnet, thereby making a record according to the signal of the box which has caused the various operations resulting in the completion of said circuit. Another branch of said circuit passes from point $x^{10}$ through conductor $x^{12}$ and release magnet $m$ of selector F and thence through conductor $x^{13}$ and the release magnet $m$ of selector H back to return at Y.

The circuit just previously traced through the magnet E' remains completed for a time sufficient to permit the action of relay E'', whereupon, the circuit through magnet $a$ of selector F being broken, the arm $b$ of that selector is permitted to return to normal. The return of arm $b$ of selector F opens contacts $x^1$ and $x^2$.

In normal operation, when no clash between signals occurs, the operation of the circuits of Fig. 16 is the same as those of Fig. 1; that is to say, during the receipt of the first digit of a box number, magnet $a$ of selector G is operated to step the arm $b$ of selector G forward to a contact point of selector G by means of a circuit from X, through magnet of relay U, conductor $x^3$, magnet $a$ of selector G, conductor 2, first contact point and arm $b$ of selector F, conductor $x^5$, magnet of relay E' and conductor $x^6$, the armature and back contact stop of relay D and conductor 7 back to return at Y. While the first digit is being received, the armature of relay E'' is away from its rear contact stop; but during the space between the first and second digits of box signal, the contact of relay E'' is closed, closing a circuit from X, through magnet $a$ of selector F, conductor 11, contact of relay E'', and conductor 7 to return at Y; whereby arm $b$ of selector F is advanced to the second contact point of that selector. During the transmission of the second digit of the box signal, a circuit is completed from X through magnet of relay U, ratchet-operating magnet $a$ of selector H (which, as already explained, is magnet 57 of Fig. 5) and conductor 12 to the second contact point of selector F, arm $b$ of that selector, conductor $x^5$, magnet of relay E', and conductor $x^6$ to armature of relay D and the rear contact stop of that relay 7 and to return at Y. Thereby magnet $a$ of selector H is operated to position the punches according to the numerical value of the second digit. At the conclusion of the second digit, the long space following causes the contact of relay E'' to be closed; the magnet $a$ of selector F is again energized, the arm $b$ of that selector is advanced to the third contact point of that selector, and a circuit is completed from X through conductor 14, conductor $x^6$, magnet of relay E', conductor $x^5$, arm $b$ of selector F, the third contact point of that selector, point $x^{10}$, magnet $m$ of that selector G, the particular contact point of selector G on which its arm $b$ then rests, and the corresponding conductor of series 21—26 to the selected punching magnet of series L—Q to return at Y; so causing the operation of the selected punching magnet. A circuit is also completed from X, through the path just traced to point $x^{10}$, and thence through release magnet $m$ of selector F and the release magnet $m$ of selector G to return at Y. Thereby all of the selectors are returned to normal condition.

Should there occur a clash or other imperfect signal in which there is not a dash similar to that of the Morse letter F (dot, dash, dot), then except for the means provided in Fig. 16 the arm $b$ of selector F would move from the first to the second contact point of that selector, at the conclusion of the clash, if not before, and would thereby cause an eventual false record.

In the event of a clash between signals, if, during the clash, a dash signal is received (as will be the case if one of the signals which clash include the Morse letter F or some other signal including, or consisting of, a dash,) the "fire signal" relays U and V will both be operated and will reset the apparatus to normal, as explained presently. No intelligible box number may have been received, or recorded on the record sheet, but this is immaterial, as the "fire drop" relay W will have given a clash indication. Relay U is operated, as will be observed, by each impulse received; but when these are dot impulses, nothing results (for present purposes), owing to the slow-acting character of that relay and of relay V. But when the impulse is a longer or dash impulse, the armature of relay U remains attracted long enough to cause relay V to attract its armature, and thereby to close a resetting circuit from X through conductor 14, conductor $x^6$, magnet of relay E', magnet of fire drop relay W, conductor $x^{15}$, contact points of relay V, conductor $x^{16}$, to point $x^{10}$, thence through release magnet $m$ of selector G, one of the contact points of that selector, the corresponding conductor of series 21—26, and the corresponding punching magnet of series L—Q, back to return at Y; also, from point $x^{10}$, through release magnets $m$ of selectors F and H back to Y. Thereby the apparatus is reset to normal, provided, as is probable, the circuit of magnet $a$ of selector F is broken, at the time, at the contacts of relay E''.

In the event of a clash occurring, with no dash received, or if the contacts of relay E'' were not separated at the proper time for resetting, clearing is effected as follows:

There will inevitably be a space, during the clash, resulting in the formation of the following circuit: from supply conductor X through the magnet of relay U, conductor $x^3$, magnet $a$ of selector G, the first contact point and arm $b$ of selector F, conductor $x^5$, magnet of relay E', conductor $x^6$, and armature of relay D to conductor 7 and thence back to return at Y. The space will result in the attraction of the armature of relay E''. At the conclusion of the space, the armature of relay E'' will drop back, completing the following circuit: from conductor X, through conductor 10, magnet $a$ of selector F, the contacts of relay E'', and conductor 7 to return at Y. This causes arm $b$ of selector F to be stepped forward from its first to its second contact point, so closing contacts $x^1$ and $x^2$. Relay U is adjusted to be slower in releasing than is relay E''. Immediately after relay E'' has completed the above circuit energizing magnet $a$ of selector F, relay U releases its armature, so closing a circuit from conductor X through the magnet of relay V and the armature and lower contact stop of relay U, conductor $x^{17}$, contacts $x^1$ and $x^2$ of master selector F, to point $x^{10}$, where the circuit divides, one branch passing through release magnet $m$ of selector G and thence to return, as previously traced, the other branch passing through release magnets $m$ of selectors F and H to Y, as previously traced. The magnet of relay V being energized thereby, closes its contacts, thereby completing a circuit from X through conductor 14, conductor $x^6$, magnet of relay E', conductor $x^5$, the magnet of fire drop relay W, conductor $x^{15}$, the contacts of relay V, and conductor $x^{16}$ to point $x^{10}$, and thence to return by the paths previously traced. The magnet of relay E' being thus energized, the magnet of relay E'' is correspondingly energized, and attracts its armature, so breaking the circuit through magnet $a$ of selector F, and permitting the arm $b$ of that selector to return to normal; the release magnet $m$ of that selector being then energized, also the release magnets $m$ of the other selectors, by the return circuits from point $x^{10}$. Thus the several selectors are returned to normal in event of a clash in which no dash occurs.

Contacts $x^1$ and $x^2$, which are separated by arm $b$ of master selector F when such arm $b$ is on the first contact point of that selector, are employed for the reason that, except for these contacts $x^1$ and $x^2$, there would be at times an undesired circuit from conductor X through magnet of relay V and through the armature and lower contact stop of relay U to point $x^{10}$ and thence to release magnets $m$ of selectors F and H, to Y, which would energize the magnet of relay V, and which would create undesirable conditions.

In Figs. 1 and 16 I have shown condensers shunted across contact points of certain of the relays to induce sparking; and I have also shown various regulating resistances.

I have also shown a resistance $x^{18}$ in shunt with respect to the magnets of relay E′ and E″. The purpose of this resistance is, mainly, to shunt out a portion of the current passing through the magnets of these relays so as to slow down the action of such magnets in attracting their armatures.

The following is the operation of the system, as shown in Fig. 1, under normal conditions:

Suppose that a watchman operate any one of the signal boxes B; thereby the line relay D is caused to operate; and during the sending of the first digit of the number of the box operated the contact arm $b$ of selector G is moved to a contact point corresponding to the said first digit. During the space between the first and second digits of the box number, the relay E, being actuated, will cause the arm $b$ of master selector F to move from its first to its second contact point, thereby cutting the actuating magnet $a$ of selector G out of circuit, and placing in circuit the magnet $a$ of selector H (being the magnet 57 of the punch shifting mechanism shown in Fig. 5). During the sending of the second digit of the box number this magnet $a$ of selector H (magnet 57) is energized to move the punches to a position corresponding to the numerical value of this second digit of the box number.

By the operation of selector G a particular punch magnet of series L—Q has been selected. By the operation of selector H a particular position of the punches has been selected. It follows, therefore, that upon energization of the selected punch magnet, a mark will be made by the selected punch at a definite point on the record sheet carried by the drum 51. Following the sending of the second digit of the box number, relay E again operates; causing arm $b$ of the master selector F to move to its third contact point, whereby the selected punch magnet of series L—Q is energized, causing the corresponding punch to make its mark on the record sheet as above mentioned; and at the same time the release magnet $m$ of selector G, also the release magnet $m$ of selectors F and H (magnet $m$ of selector H being the same as magnet 64, Fig. 5) are energized and also the circuit of magnet $a$ of master selector F is broken. The return of the arms $b$ of selectors F and G results, also the return of the punch carriage of selectors H; and the apparatus is in condition to receive and record the number of the same or any other box of the system.

Suppose now that the watchman is delinquent in sending in the signal. As previously explained with particular reference to Figs. 2–4 inclusive and 9 and 10, whenever one of the punch magnets of series L—Q is operated, the arm 71 is pulled back, thereby preventing the closing of the delinquency signal circuit; but if the watchman be delinquent in the sending of the signal to and beyond the end of the grace period, one of the arms L‴, M‴, etc., will contact with spring 75, forcing that spring into contact with spring 76, and so closing circuit through the delinquency signal devices 79, so giving the delinquency signal.

In the event of a fire signal being given from one of the boxes B, the operation, in so far as the sending of the first round of the box number, will be the same as above described. Following this first round the Morse letter F (.—.) will be transmitted, and the dash of this Morse letter F will cause the operation of the relays U and V, whereby the drop relay W will be operated, cutting the register 17 into circuit, and causing that register 17, therefore, to receive and record subsequent rounds of the box signal. Cutting of this register 17 into the circuit does not interfere with the subsequent rounds of the box number being recorded on the record sheet of the drum 51; to the contrary, in the recording of fire signals a double record is made.

What I claim is:

1. In a recording system, the combination with a plurality of recording mechanisms each adapted to make one or another of a plurality of distinctive records under control of corresponding signals, of a plurality of signal-transmitting devices and a common circuit therefor, each such-signal-transmitting device arranged to transmit a signal different from the signals of all the other said transmitting devices, and selecting means arranged to be operated by said signals transmitted through said circuit and arranged to determine a particular recording mechanism to be finally actuated and as a result of the complete operation of said selecting means and to determine the particular record to be made by the so-selected recording mechanism.

2. In a recording system the combination with a plurality of recording mechanisms each adapted to make one or another of a plurality of distinctive records under control of corresponding signals, of a plurality of groups of signal transmitting devices and a common circuit therefor, said signal transmitting devices arranged to transmit numerical signals, the signal of each transmitting device being different from the signals of all the other transmitting devices, the signal of each such transmitting device comprising a plurality of digits, all the transmitting devices of any one group having one digit in common, which is different from the corresponding digit of the signals of the other groups of transmitting devices, selecting means arranged to be operated by such common digit of the signals transmitted through said circuit for determining the recording mechanism to be actuated, and other selecting means operated by another digit of the signals for determining the record to be made by the so-selected recording mechanism.

3. In a recording system, the combination with a plurality of recording mechanisms each comprising record-positioning means, of a plurality of groups of signal-transmitting devices and a common circuit therefor, said signal-transmitting devices each arranged to transmit a signal different from the signal of all the other transmitting devices, and selecting means arranged to be operated by such signals transmitted through said circuit and arranged to select, according to said signals, and as a result of the complete operation of said selecting means one or another of said recording mechanisms, and to operate the so-selected recording mechanism to determine the position of the record to be made thereby.

4. In a recording system, the combination with a plurality of recording mechanisms each comprising record-positioning means, of a plurality of groups of signal-transmitting devices and a common circuit therefor, said signal transmitting devices arranged to transmit numerical signals, the signal of each transmitting device being different from the signals of all the other transmitting devices, the signal of each such transmitting device comprising a plurality of digits, all the transmitting devices of any one group having one digit in common which is different from the corresponding digit of the signals of the other groups of transmitting devices, selecting means arranged to be operated by such common digit of the signals transmitted through such circuit for determining the recording mechanism to be actuated, and other selecting means operated by another digit of the signals arranged to operate the position-determining means of the selected recording mechanism to determine the position of the record to be made by such recording mechanism.

5. In a recording system, the combination with a plurality of recording mechanisms each adapted to make one or another of a plurality of distinctive records under control of corresponding signals, of a plurality of signal transmitting devices and a common circuit therefor, each such signal-transmitting device arranged to transmit a signal different from the signals of all the other said transmitting devices, each such signal comprising a plurality of digits separated one from another by a space longer than the spaces between impulses of each digit, selecting means arranged to be operated by one such digit of each signal for determining the particular recording mechanism to be actuated, selecting means operated by another digit of each such signal for determining the particular record to be made by the so-selected recording mechanism, and means operated by the space between digits of the signals for throwing the one selecting mechanism out of operation and for throwing the other selecting mechanism into operation.

6. In a recording system, the combination with a plurality of recording mechanisms each comprising record-positioning means, of a plurality of groups of signal-transmitting devices and a common circuit therefor, said signal transmitting devices arranged to transmit numerical signals each comprising a plurality of digits separated by a space of greater length than the spaces between impulses of each digit, selecting means arranged to be operated by one digit of each such signal for determining the particular recording mechanism to be actuated, selecting means operated by another digit of each such signal for determining the particular record to be made by the so-selected recording mechanism, and means operated by the space between digits of the signals for throwing the one selecting mechanism out of operation and for throwing the other selecting mechanism into operation.

7. In a recorder, the combination of a plurality of recording devices, a record carrier upon which such recording devices may make records, means for producing relative movement between said recording devices and record carrier, and selecting means, adapted for control by line signals and adapted to select a particular recording device and to produce relative motion between that recording device and the record carrier to bring the recording device opposite a signal-determined position on the record carrier.

8. In a recorder, the combination of a plurality of recording devices, a record carrier upon which such recording devices may make records, means for producing relative movement between said recording devices and record carrier, and selecting means arranged to select a particular recording device under the influence of line signals, and other selecting means arranged, under control of line signals, to cause relative motion between the selected recording device and the record carrier to bring that recording device opposite a signal-determined position on the record carrier.

9. In a recorder, the combination of a plurality of recording devices, a record carrier on which such recording devices may make records, means for selecting a particular recording device under the influence of line signals, and for operating the so-selected recording device, and means for moving the recording devices with respect to said record carrier.

10. In a recorder, the combination of a movable recorder-carriage, step-by-step mechanism for moving the same, automatic return means for said carriage, a plurality of recording devices mounted on said carriage, means for operating the same, and means for selecting any one of said recording devices under the influence of line signals.

11. In a recorder, the combination of a movable recorder-carriage, ratchet mechanism for moving the same, automatic return means for said carriage, a plurality of recording devices mounted on said carriage, means for operating the same, and means for selecting any one of said recording devices under the influence of line signals.

12. In a recorder, the combination of a movable recorder-carriage, step-by-step mechanism for moving the same, means for returning said carriage, a plurality of punches mounted on said carriage, operating means therefor, and means for selecting any particular punch under the influence of line signals.

13. In a recorder, the combination of a movable recorder-carriage, ratchet mechanism for moving the same, means for returning said carriage, a plurality of punches mounted on said carriage, operating means therefor, and means for selecting any particular punch under the influence of line signals.

14. In a recorder, the combination of a sliding punch carriage, ratchet mechanism for moving said carriage in one direction, means for returning said carriage, a holding device, a magnet for releasing said holding device and permitting return of the carriage, a plurality of punches on said carriage, armatures for said magnets for operating said punches, and selecting means adapted, under control of line signals, to select any one of said punch magnets, to operate said ratchet mechanism to position the selected punch, and to cause the operation of the selected punch magnet and its corresponding punch.

15. In a recorder, the combination of a sliding punch carriage, ratchet mechanism for moving said carriage in one direction, means for returning said carriage, a holding device, a magnet for releasing said holding device and permitting return of the carriage, a plurality of punches on said carriage, armatures for said magnets for operating said punches, said magnets having broad-faced hammers adapted each to actuate its corresponding punch in any position of that punch, and selecting means adapted, under control of line signals, to select any one of said punch magnets, to operate said ratchet mechanism to position the selected punch, and to cause the operation of the selected punch magnet and its corresponding punch.

16. In a recorder, the combination of a movable record-carrier, means for driving the same, recording means, comprising an operating magnet arranged to make records on such carrier, and a delinquency signal device comprising a rotary member driven by said record-carrier driving means and arranged to close a delinquency signal-circuit at predetermined times, together with means, operated by said magnet, arranged to prevent closing of such circuit, when said recording magnet is energized at predetermined times.

17. In a recorder, the combination of a movable record-carrier, means for driving the same, recording means arranged to make records on such carrier and comprising an operating magnet, and a delinquency signal device comprising contact means tending to make contact with each other, a contact member movably mounted upon said rotary member and having a ratchet-connection therewith, and arranged to contact with one of said contact means and thereby to separate it from the other said contact means after having first completed the circuit through said contact means, means arranged to bring said contact means together at predetermined intervals, to complete the circuit, and means operated by said magnet for withdrawing such ratchet-connected member from said contact means when said magnet is operated.

18. In a delinquency signal device, the combination of two contact devices tending normally to make contact one with another, a rotatable member suitably driven, contact means having a slip-connection therewith and adapted to contact with one of said contact devices and thereby to complete a signal circuit and thereafter to separate said contact devices, and itself to be arrested by one of said contact devices, and signal-operated means arranged when operated to reset said contact means and thereby to cause it to start movement again with said rotatable member.

19. In a delinquency signal device, the combination of two contact devices tending normally to make contact one with another, a rotatable member suitably driven, contact means having a slip-connection therewith and adapted to contact with one of said contact devices, and thereby to complete a signal circuit, and signal-operated means arranged when operated to reset said contact means and thereby to cause it to start movement again with said rotatable member, and a plurality of signal operated means each connected independently with said contact means, and arranged when operated to reset said contact means and thereby to cause it to start movement again with said rotatable member.

20. The combination with a plurality of delinquency signal devices, each comprising means for operating a delinquency signal circuit at predetermined intervals, a line circuit comprising a plurality of groups of signal transmitters, each such group corresponding to a particular one of such delinquency signal devices, and selecting means arranged to be operated by signals from said transmitters and arranged to affect the operation of each delinquency signal device by signals received from a transmitter of the corresponding group only.

21. In a recording system, the combination with a plurality of recording mechanisms each adapted to make one or another of a plurality of distinctive records under control of corresponding signals, of a plurality of signal-transmitting devices and a common circuit therefor, each such signal-transmitting device arranged to transmit a signal, different from the signals of all the other said transmitting devices and comprising a plurality of digits separated by a space longer than the spaces between impulses of the digits, selecting means arranged to be operated by said signals transmitted through said circuit, for determining the particular recording mechanism to be actuated and for determining the particular record to be made by the so-selected recording mechanism, such selecting means comprising a master selector, and a governor arranged to distinguish between spaces between impulses of the digits and the longer spaces between digits, and to operate said master selector upon the occurrence of spaces between digits.

22. In a recording system, the combination with a plurality of recording mechanisms each adapted to make one or another of a plurality of distinctive records under control of corresponding signals, of a plurality of signal-transmitting devices and a common circuit therefor, each such signal-transmitting device arranged to transmit a signal, different from the signals of all the other said transmitting devices and comprising a plurality of digits separated by a space longer than the spaces between impulses of the digits, selecting means arranged to be operated by said signals transmitted through said circuit, for determining the particular recording mechanism to be actuated and for determining the particular record to be made by the so-selected recording mechanism, such selecting means comprising a master selector, and a short-circuited core governor relay arranged to distinguish between spaces between impulses of the digits and the longer spaces between digits, and to operate said master selector upon the occurrence of spaces between digits.

23. In a recording system, the combination with a plurality of recording mechanisms each adapted to make one or another of a plurality of distinctive records under control of corresponding signals, of a plurality of signal-transmitting devices and a common circuit therefor, each such signal-transmitting device arranged to transmit a signal, different from the signals of all the other said transmitting devices and comprising a plurality of digits separated by a space longer than the spaces between impulses of the digits, selecting means arranged to be operated by said signals transmitted through said circuit, for determining the particular recording mechanism to be actuated and for determining the particular record to be made by the so-selected recording mechanism, such selecting means comprising a master selector, and a plurality of short-circuited core governor relays connected in "cascade" series arranged to distinguish between spaces between impulses of the digits and the longer spaces between digits, and to operate said master selector upon the occurrence of spaces between digits.

24. In a selecting mechanism, the combination of two selectors each comprising an arcuate series of contact segments, a swinging contact arm to sweep thereover, and magnet-operated mechanism for so moving said contact arm, the contact-segment arcs of said selectors being adjacent one another, the said contact arms of the two selectors being mounted at points which are approximately diagonally opposite with respect to the two segment arcs.

25. A selector comprising a series of contact points, a contact arm arranged to sweep thereover, mechanism for so moving said contact arm, means tending to return said contact arm, and magnet-operated stop means comprising a release member, a pawl carried thereby, an armature for said magnet arranged to engage said pawl when said magnet is energized, said armature further arranged to carry said pawl, and thereby said release member, with it when said armature retracts, and means for disengaging said pawl from said armature upon return of said contact arm.

26. In a recording system, the combination of a relay operated by line signals, a space-operated governor, selectors arranged to be operated by said line relay and a master selector arranged to switch an actuating circuit operated by said line relay from one selector to another under control of said governor.

27. In a recording system, the combination of a relay operated by line signals, a space-operated governor, selectors arranged to be operated by said line relay and a master selector arranged to switch an actuating circuit operated by said line relay from one selector to another under control of said governor, each such selector comprising restoring means, and a restoring circuit for said selectors passing through a contact of the master selector.

28. In a recording system, the combination of a relay operated by line signals, a space-operated governor, selectors arranged to be operated by said line relay and a master selector arranged to switch an actuating circuit operated by said line relay from one selector to another under control of said governor, each such selector comprising restoring means, a restoring circuit for said selectors passing through a contact of the master selector, and a contact device arranged to be operated by a dash-signal, and arranged to operate said restoring circuit.

29. In a recording system, the combination of a relay operated by line signals, a space-operated governor, selectors arranged to be operated by said line relay and a master selector arranged to switch an actuating circuit operated by said line relay from one selector to another under control of said governor, each such selector comprising restoring means, a restoring circuit for said selectors passing through a contact of the master selector, and two slow acting relays connected in cascade series and arranged to be operated jointly by a dash signal, and when so operated to operate said restoring circuit.

30. In a recording system, the combination of a relay operated by line signals, a master selector having contact points, and having also an operating magnet, other selectors also having operating magnets connected to contact points of the master selector, an operating circuit for the operating magnets of such other selectors passing through the corresponding contact points of the master selector and through a contact of the said relay, a space-operated governor included in the circuit of the said selector-magnets, said selectors having release means, a circuit for said release means controlled by the master selector, and a circuit for the operating magnet of the master selector controlled by a contact of said governor.

31. In a recording system, the combination of a relay operated by line signals, a master selector having contact points, and having also an operating magnet, other selectors also having operating magnets connected to contact points of the master selector, an operating circuit for the operating magnets of such other selectors passing through the corresponding contact points of the master selector and through a contact of the said relay, a space-operated governor included in the circuit of the said selector-magnets, said selectors having release means, a circuit for said release means controlled by the master selector, a circuit for the operating magnet of the master selector controlled by a contact of said governor, and a contact device arranged to be operated by a dash-signal, and arranged to operate said release means.

32. In a recording system, the combination of a relay operated by line signals, a master selector having contact points, other selectors having operating magnets connected to contact points of the master selector, an operating circuit for said operating magnets passing through the corresponding contact points of the master selector and through a contact of the said relay, a space-operated governor included in the said operating circuit of the said selector-magnets, said selectors having release means, a circuit for said release means controlled by the master selector, said master selector having an operating magnet, a circuit for the operating magnet of the master selector controlled by a contact of said governor, and two slow acting relays connected in cascade series and arranged to be operated jointly by a dash-signal, and when so operated to operate said release circuit.

33. In a recording system, the combination of a relay operated by line signals, a master selector having contact points, other selectors having operating magnets connected to contact points of the master selector, an operating circuit for said operating magnets passing through the corresponding contact points of the master selector and through a contact of the said relay, a space-operated governor included in the said operating circuit of the said selector-magnets, said selectors having release means, a circuit for said release means controlled by the master selector, two slow acting relays connected in cascade series in the said operating circuit for the operating magnets of said selectors, and arranged to be operated jointly by a dash-signal, and when so operated to operate said restoring circuit, said master selector having an operating magnet and a circuit for the operating magnet of the master selector controlled by a contact of said governor.

34. In a recording system, the combination of a relay operated by line signals, a space-operated governor, selectors arranged to be operated by said line relay and a master selector arranged to switch an actuating circuit operated by said line relay from one selector to another under control of said governor, each such selector comprising restoring means, a restoring circuit for said selectors passing through a contact of the master selector and means for restoring said selectors to normal in the event of the disturbance of one or more of said selectors by clashing signals.

35. The combination with a plurality of groups of signal transmitting devices, and a recorder having a plurality of recording devices, one for each such group, each such recording device comprising an operating magnet, selecting means operated by signals from said signal transmitters, and arranged to determine the particular recording mechanism to be operated, a delinquency signal device comprising means for operating a delinquency signal circuit at predetermined intervals, said delinquency signal device comprising means adapted to be reset to start the operation of such delinquency signal device over again, each such magnet comprising means whereby, when such magnet is actuated, it will cause the resetting of such resettable member of the delinquency signaling device.

36. An indicating system comprising a plurality of indicating devices adapted one or another to be selected for operation, and automatic electro-magnetic selecting apparatus adapted to be controlled by groups of current impulses separated into a plurality of digits by spaces longer than the spaces between impulses of each digit, such selecting means comprising space-controlled means whereby the several digits are caused to operate different portions of said selecting means to the end that any desired one of said indicating devices shall be selected ultimately.

37. A recording system comprising a plurality of recording devices adapted one or another to be selected for operation, and automatic electro-magnetic selecting apparatus adapted to be controlled by groups of current impulses separated into a plurality of digits by spaces longer than the spaces between impulses of each digit, such selecting means comprising space-controlled means whereby the several digits are caused to operate different portions of said selecting means to the end that any desired one of said recording devices shall be selected ultimately, and means coöperating with said recording devices for effecting the production of a permanent record.

38. An indicating system comprising a plurality of indicating devices adapted one or another to be selected for operation, and automatic electro-magnetic selecting apparatus adapted to be controlled by groups of current impulses separated into a plurality of digits by spaces longer than the spaces between impulses of each digit, and comprising a plurality of independent switching devices each adapted to be operated by the impulses of one of the digits of the signal, together with master selecting means and space-operated means arranged, under influence of the long spaces between digits, to operate the master selecting means for bringing one or another of the digit-operated selecting means into operation.

39. A recording system comprising a plurality of recording devices adapted one or another to be selected for operation, and automatic electro-magnetic selecting apparatus adapted to be controlled by groups of current impulses separated into a plurality of digits by spaces longer than the spaces between impulses of each digit, and comprising a plurality of independent switching devices each adapted to be operated by the impulses of one of the digits of the signal, together with master selecting means and space-operated means arranged, under influence of the long spaces between digits, to operate the master selecting means for bringing one or another of the digit-operated selecting means into operation, and means coöperating with said recording devices for effecting the production of a permanent record.

In testimony whereof I have signed this specification in the presence of two subscribing witnesses.

RICHARD M. HOPKINS.

Witnesses:
GRACE HILDEBRANT,
FRANK A. MORLEY.

Copies of this patent may be obtained for five cents each, by addressing the "Commissioner of Patents, Washington, D. C."